Feb. 8, 1938.   R. MAYNE   2,107,490
TRACK FOR TRACTORS
Filed Aug. 4, 1934
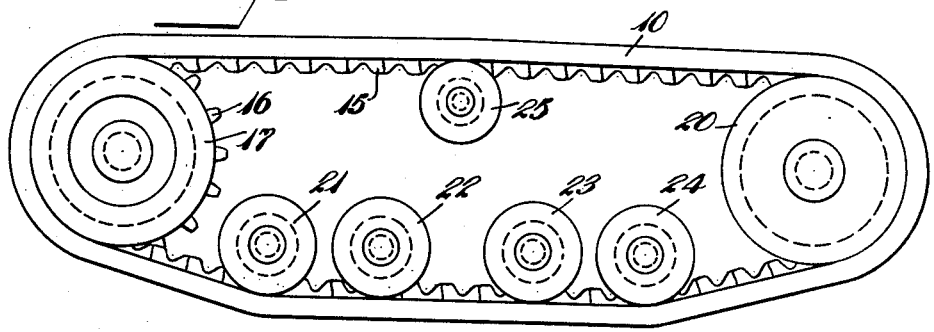
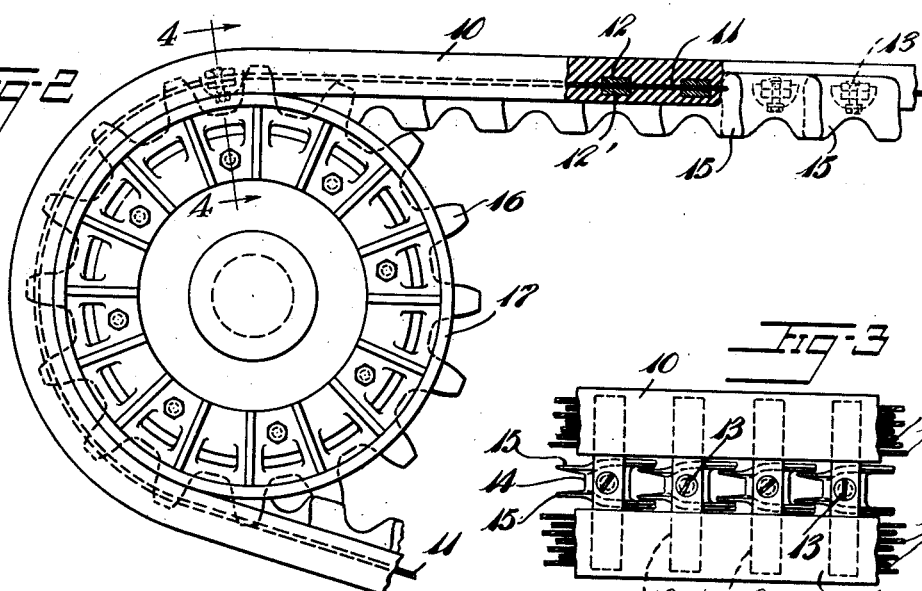
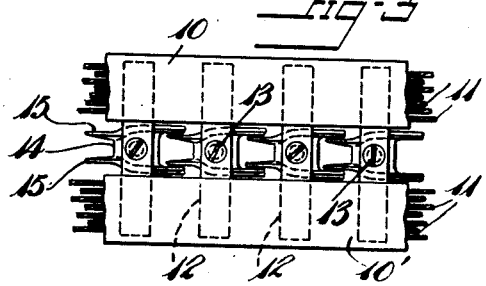
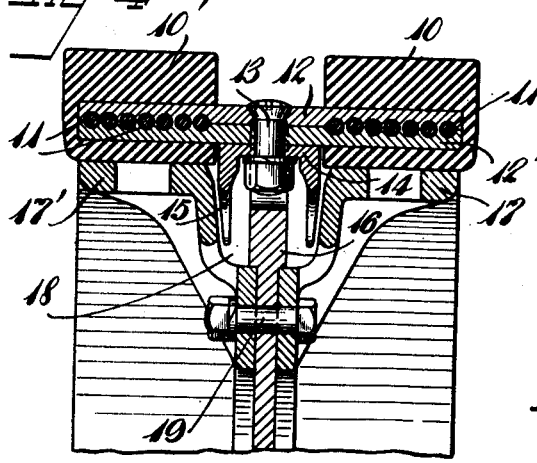
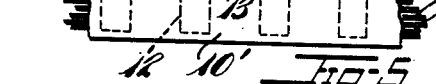
Inventor
Robert Mayne
By Eakin & Avery
Attys- Patented Feb. 8, 1938

2,107,490

UNITED STATES PATENT OFFICE 2,107,490

TRACK FOR TRACTORS

Robert Mayne, Akron, Ohio, assignor to The B. F. Goodrich Company, New York, N. Y., a corporation of New York Application August 4, 1934, Serial No. 738,393

11 Claims. (Cl. 305—10)

This invention relates to an endless belt-like track for use on tractors or other vehicles of the self-laying track type.

The principal objects of the invention are to provide resistance to wear, to provide flexibility in the direction of movement, and to provide resistance to lateral flexing and to accomplish guiding of the track about the driving sprocket and throughout an unsupported reach of the track by a single means.

Other objects are to reduce noise and corrosion, and to increase traction and improve cushioning of the track. Other objects will appear from the following description and the accompanying drawing.

In the drawing:

Fig. 1 is a side elevation of the preferred form of the track and its driving sprockets and guide pulleys.

Fig. 2 is a similar view drawn to a larger scale and showing only a part of the belt and drive sprocket, a portion of the belt being broken away and shown in section.

Fig. 3 is a plan view of a portion of the preferred form of the belt.

Fig. 4 is a cross-sectional view taken on line 4—4 of Fig. 2.

Fig. 5 is a view similar to Fig. 3 showing a modified form of the device.

Referring to the drawing, the belt comprises a pair of spaced vulcanized rubber tread bands 10, 10', preferably but not necessarily continuous, which are each reinforced by laterally spaced parallel strands of wire cable 11. This provides a smooth running tread which increases traction, especially on smooth pavements, reduces noise and vibration, and, by the enclosure of the cables, prevents corrosion thereof. All of the strands of cable are attached at spaced intervals to metal cross bars 12, 12' having suitable notches formed in their faces for receiving and spacing the cable. Bars 12, 12' may be held in clamping relation by bolts 13 passing therethrough, but preferably are attached to the cables by adhesion between the metal cables and bars due to the rubber therebetween.

In order to provide replaceable wear surfaces where the driving sprocket engages the cross bars, and to provide a single means for preventing lateral misalignment of the chain where it passes over the driving sprocket as well as throughout the upper reach of the track, each cross bar is provided with a removable wear member 14, fastened thereto by the bolts 13, and these wear members are provided with integral guide plates 15 extending therefrom so as to engage each other in intercalated sliding relation. Where the drive wheel comprises a single sprocket, the sprocket teeth enter between pairs of guide plates 15, as shown in Figs. 3 and 4. In the latter figure the numeral 16 designates the sprocket, which is flanked by coaxially mounted guide pulleys 17, 17'. A groove 18 is provided between each guide pulley and the sprocket for receiving and guiding the guide plates 15. The pulleys 17, 17', and the sprocket 16 are held together by bolts 19.

In some installations it is desirable to employ a pair of driving sprockets laterally spaced apart on the same shaft. Where this is done, the wear members 14 may be constructed as shown in Fig. 5, where the guide plates are located between the sprockets.

In use the belt not only surrounds a sprocket 16 and its pulleys 17, 17', but a supporting pulley 20 and guide pulleys 21, 22, 23, 24, and 25, as shown in Fig. 1. As the guide plates 15 extend past each other a considerable distance in sliding engagement, they prevent undue lateral flexing of the belt between guide pulleys, especially when the tractor is travelling on sloping ground, and the constant engagement of the plates 15 in the space 18 between the pulleys 17, 17, prevents the belt from climbing the sprocket.

The rubber forming the tread bands 10, 10', is adhered to the cables by vulcanization and for this purpose the cables may be cleaned and electro-plated or otherwise coated with rubber adherent metal such as a mixture of copper and zinc or they may be coated with a heat plastic rubber isomer and their interstices filled with rubber to insulate the wires from each other and protect them from abrasion. The surfaces of the cross-bars 12, 12' may be treated in similar manner to make them rubber-adherent and rubber may be applied between the cross bars and the cables to secure the bars to the cables. The rubber tread members 10, 10' are then built up about the cables and their assembled cross bars, and the rubber vulcanized under heat and pressure, preferably by confining it in a mold. After vulcanization of the belt, the wear members 14 are fastened to the cross bars. Where it is desired to form the tread members 10, 10' with non-skid designs, this may be done by suitably shaping the mold.

I claim:

1. A self-laying track comprising parallel strands of wire cable, a plurality of metal cross bars fixed to the cables at regular intervals and adapted to engage a drive sprocket, a vulcanized rubber tread attached to the cables, and a removable wear member mounted on each cross bar and adapted to engage a sprocket wheel, said wear members being formed with guide lugs, the guide lugs of each wear member being adapted slidably to engage the guide lugs of an adjacent wear member to limit lateral flexing of the track.

2. A self-laying track comprising parallel endless vulcanized rubber tread bands, inextensible flexible metal reinforcing members embedded therein, a plurality of regularly spaced cross bars connecting said tread bands and adapted to engage a drive sprocket, and a series of plates each having firm connection to a reinforcing member and overlapping an adjacent plate of the series to limit lateral flexing of the track.

3. A self-laying track comprising substantially inextensible but flexible tension elements, a plurality of metal cross bars fixed to the said elements at regular intervals and adapted to engage a drive sprocket, rubber treads each vulcanized about a tension element, said treads being adapted to engage a pair of supporting pulleys coaxial with the driving sprocket, and a series of plates each having firm connection to the tension elements and overlapping an adjacent plate to limit lateral flexure of the track.

4. A self-laying track comprising substantially inextensible but flexible tension elements, a vulcanized rubber tread enclosing said elements, cross members connecting said elements at intervals but so spaced apart as to leave freely flexible between adjacent bars reaches of the tension elements longer than the bars are wide, and a series of plates each having connection to the tension elements and overlapping an adjacent plate of the series in a region closely adjacent the middle line of the track for limiting lateral flexure of the track.

5. A self-laying track comprising substantially inextensible but flexible tension elements, cross-members connecting said elements at intervals but so spaced apart as to leave freely flexible between adjacent bars reaches of the tension elements longer than the bars are wide, a series of plates each having firm connection to the tension elements and overlapping an adjacent plate of the series for limiting lateral flexure of the track, and a rubber tread member secured to and enclosing said tension elements.

6. A self-laying track as defined in claim 5 in which the plates overlap each other in a region closely adjacent the middle line of the track.

7. A self-laying track comprising parallel strands of wire cable, metal cross bars attached at intervals to the cable at a straight portion thereof solely by a vulcanized rubber bond, and a vulcanized rubber tread member surrounding said cable and said bars and attached thereto by vulcanization.

8. A self-laying track comprising substantially inextensible but flexible tension elements, cross members positioned at intervals along said elements and secured to straight portions thereof without clamping pressure thereon, the attachment being effected solely by interposed rubber in vulcanized bond with the cross members and tension elements, and means associated with said cross members for cooperating with a driving element.

9. A self-laying track comprising a series of elements adapted to engage a sprocket connected in such spaced relation by flexible tension members that reaches of the tension members longer than the said elements are wide are left freely flexible between adjacent elements, and guide flanges firmly attached to each of the said elements and overlapping the guide flanges on an adjacent element, the said flanges of each set overlapping for such distance lengthwise of the track in relation to the distance laterally of the track between their engaging surfaces as to limit lateral flexing of the track in the manner of a socket maintaining alignment of a member inserted therein, said tension elements being entirely enclosed in a vulcanized rubber tread.

10. A self-laying track comprising substantially inextensible but flexible tension elements, and cross members secured to said elements at intervals along the same for cooperating with a driving means, said cross members being held completely out of contact with said elements by rubber and being secured to the elements solely by adhesion of the rubber to the cross members and elements without clamping pressure of the members upon the elements.

11. A self-laying track comprising tension cables, cross members secured to said cables at intervals along the same for cooperating with a driving means, and a rubber tread upon the cables and cross members, said cross members being held completely out of contact with the cables by an intervening layer of rubber and being secured to the cables solely by adhesion of the rubber to the cross members and cables without clamping pressure of said members upon the cables.

ROBERT MAYNE.